Figure 2:
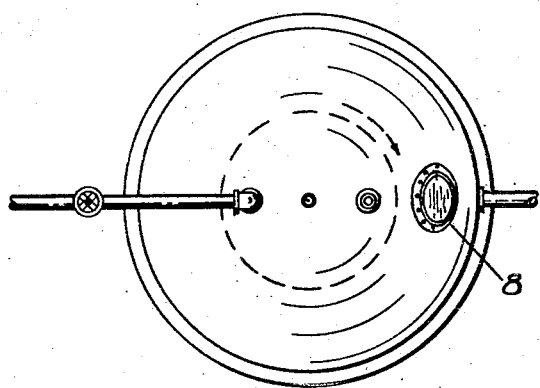

Sept. 28, 1948.   G. SINGLETON   2,450,097
PROCESSING FRUIT JUICE
Filed Oct. 4, 1945

INVENTOR.
Gray Singleton
BY
Munn, Liddy, Slocum & Rich
attys.

Patented Sept. 28, 1948

2,450,097

UNITED STATES PATENT OFFICE 2,450,097

PROCESSING FRUIT JUICES

Gray Singleton, Lakeland, Fla.

Application October 4, 1945, Serial No. 620,373

10 Claims. (Cl. 99—155)

My present invention has for its object to provide a process for the treatment of fruit juices whereby their natural flavor is retained and the juices will be preserved against deterioration in sealed vessels over a long period.

The invention embodies means of separating from a fluid body two or more elements having boiling points at different temperatures, such as exist in fruit juices, which embodies the process of treating the fluid in a closed vessel at the boiling point of the lower element to bring the other, or others, to the surface of the ebullient fluid which is in a state of agitation, and then by the application of a vacuum creating an accelerated rate of flow of the vapors generated which will entrain or carry with them portions of those elements having the higher boiling point, or points, and which themselves have not been vaporized. In applying this invention to the treatment of fruit juices, not only is it possible to eliminate unwanted constituents in the juice rapidly, but it is possible to hold the temperature of the juices being treated at a point which avoids their caramelization.

Another object of my invention comprehends the steps in the process of treating fruit juices to remove the undesirable fractions of peel oil, which include the limonene and fatty acids present in the crushed fruit, while retaining a high percentage of its ascorbic acid, or vitamin C.

A still further object of the invention extends to the method of treating fruit juices in such a manner that those volatile acids, which will in time attack metal containers, are extracted, thus preserving the containers per se, and prevent the latter from affecting the taste of their contents, as well as to prevent the occurrence of catalytic oxidation, which lessens the vitamin content of the juices.

To these and other ends my invention embodies certain additional improvements, all of which will be described in the following specification, the novel features thereof being set forth in the appended claims.

Figure 1:
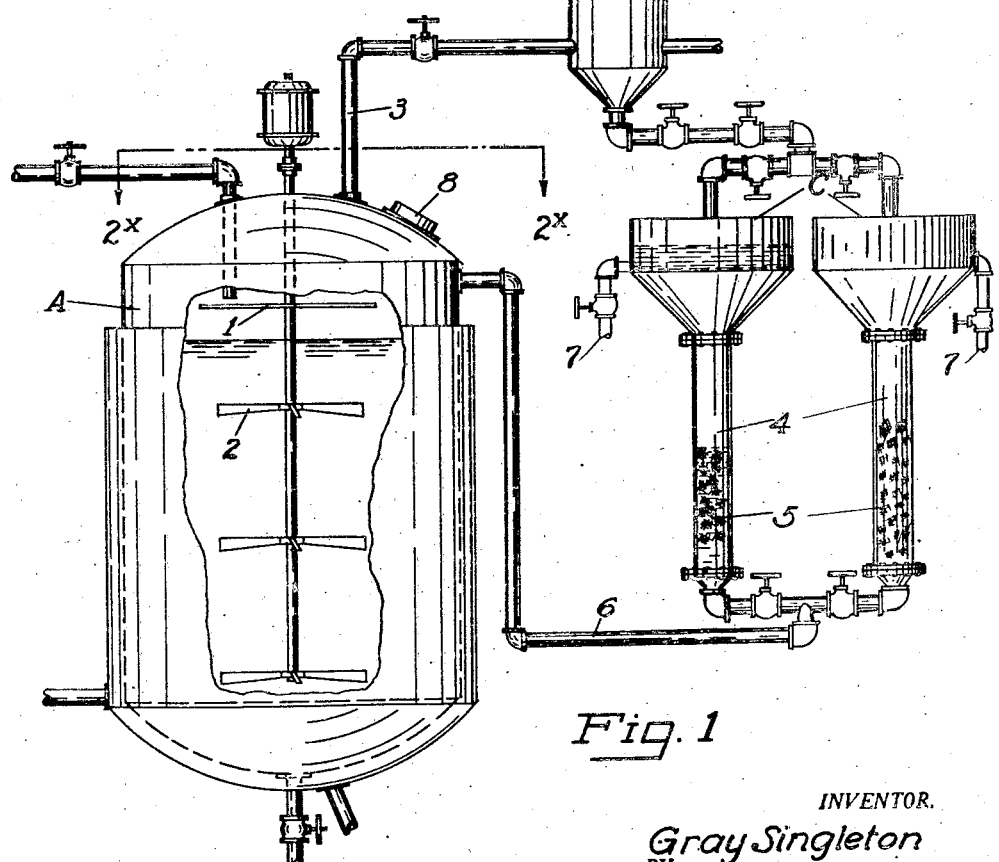

In the drawings:

Figure 1 is a diagrammatic illustration of apparatus suitable for performing certain steps of my process, and Figure 2 is a top plan view as seen along the line 2$^x$—2$^x$ of Fig. 1.

My invention is applicable in the treatment of the juices of various fruits, particularly those having thick or heavy peels, such as oranges, grapefruit, tangerines, and mangoes, from any one of which it may be desired to so treat the juice that it may be held indefinitely for future use in suitable vessels, preferably in metal containers such as the well known cans made of tin plate.

In carrying out my invention, the fruit to be processed is first thoroughly washed to remove any deleterious substances, such as scale or mold. Thereafter it is cut into pieces, either as thin slices, or, as I prefer, into quarter sections, as I find that the juice can be pressed from such sections under a slight pressure, which minimizes the percentage of undesirable components being expressed from the rinds of the fruit, such as peel oil and "green juice," especially if the rinds containing the albedo of the fruit are thick.

Practice demonstrates that it is impossible, at least in a profitable commercial operation, to express the raw fruit juice without also contaminating it with the "green juice" from the albedo and a certain quantity of peel oil. Said green juice causes agglomeration and settling of pulp in the fruit juice and eventually produces a disagreeable flavor. The peel oil contains limonene and fatty acid fractions, such as formic acid, caprylic and capric acids. It is essential that the limonene, which imparts a terpene taste to the juice, be removed and that the fatty acid fractions, which impart a rancid odor on oxidation of the product, be also removed without disturbing the fractions in the fruit juice which impart to the juice the desirable flavor of the fruit. In this preliminary statement with reference to my process, I wish to point out that, if there is a complete removal of the peel oil, the fruit juice becomes flat and tasteless, hence I have devised a method by which the amount of this material can be reduced as desired and the quantity which is retained be regulated to a nicety.

By first quartering the fruit into segments and then subjecting it to a light squeezing pressure of approximately five pounds to the square inch, I obtain juice which contains very little pulp. From this juice I may remove the undesirable fractions of the peel oil by skimming it from the top of a boiling mass of juice, as it is distinguishable by its color—yellow with orange juice, white with grapefruit juice, and red with the juice from tangerines. In such a heated mass the peel oil begins to rise to the surface at 190° F. and only a small portion is lost by evaporation. However, this is not a wholly satisfactory operation, as the fatty acid fractions may still remain. My invention further comprehends carrying out the process in a speedy, continuous manner in closed receptacles which affords accurate control of the peel oil content in the finished product, which enables the temperature of the juice to be kept down to that desired for pasteurization.

One method, according to my invention, for removing the undesirable fractions of peel oil from fruit juice is to boil the juice for a few minutes in a closed vessel which has a small outlet, whereby the combination of vapor pressure and steam pressure and steam velocity carries away both the limonene and fatty acid fractions. The boiling points of most of the peel oil is approximately 349° F., far above that of the boiling juice, which is usually about 214° F. In test runs it was found that, with a 10″ outlet, or practically an open vessel, of one-gallon capacity, 97% of the peel oil present in the fresh juice remained floating on the juice after boiling 10 minutes. Using the same kettle with a 1″ outlet, it was found that 96% of the oil had passed off with the steam after boiling for the same length of time, as shown by the following table:

*Valencia orange juice*

| Processing time in minutes without vacuum, 214° F. | 0 | 3 | 5 | 7 | 8 | 10 | 15 | With 15 inches vacuum, 190° F. 20 sec. |
|---|---|---|---|---|---|---|---|---|
| First test: Parts of peel oil remaining, per 100,000 parts of juice | Per cent .078 | .025 | .016 | .010 | .005 | .002 | Per cent .001 | Per cent .011 |
| Second test: Medium peel oil | .031 | .018 | .012 | .007 | .004 | .002 | .001 | .008 |

Research indicates that juice having the best taste and keeping qualities should not exceed in 100,000 parts of juice, 6 to 10 parts of peel oil for oranges and tangerines, and 3 to 5 parts thereof for grapefruit. Such low peel content has not, to my knowledge, been heretofore obtained commercially, and I have demonstrated that, by reason of such low content, the juice will keep at room temperature for years in any climate.

In practice, I preheat the juice sufficiently to inactivate any enzymes which may cause trouble. I consider it desirable to keep the temperature as low as possible, and at the temperature stated I introduce it into a closed steam-jacketed vessel A, see Fig. 1, where it impinges on a rotating disc 1, which breaks up the stream directing it against the top of the side walls of the vessel. In the latter are agitator blades 2 which circulate the fluid mass, serving to maintain therethrough a constant temperature to prevent caramelization.

In the top of tank A is a sight glass 8, and at its bottom is a valve controlled outlet 9, leading to the can filling machines or other receptacles employed for distribution of the finished product.

The fluid entering the vessel is subjected to a partial vacuum which serves the dual purpose of deaerating the fruit juice and drawing off the peel oil vapor, together with the fatty acid fractions or volatile constituents thereof. This is best accomplished by using a comparatively small vacuum outlet 3, when using a 600-gallon tank, with a vacuum, during the filling of the tank, of approximately nine inches, which may be increased to approximately twelve to fifteen inches, depending on the temperature of the juice. The vapors thus drawn off pass through a condenser B, from which the condensate descends into a funnel-shaped receiver C and accumulates in a columnar filter 4, preferably containing activated vegetable charcoal 5, such as that identified as Nuchar WA. Such filters should be arranged in pairs to permit their alternate use so that when the active life of the carbon in one is spent, it can be replaced by switching to the other without stopping the flow of juice.

The receivers C, which may also be termed decantation tanks, are arranged in a plane above the level of the juice in tank A, and leading from the bottoms of the filter columns 4 is a return pipe 6 which discharges into the tank at the set height of the fluid level in the receiver C and above the level of the juice in the tank A. At one side of the receivers is a draw-off, or valve controlled drain pipe 7, for removal of limonene. Limonene floats on the surface of the condensate above the return feed pipe 6 and is recoverable through the drain pipe 7. The fatty acids, such as formic, caprylic and capric acids, in the amounts present, are soluble in water and hence are adsorbed on the charcoal in the filter 5.

The filtering of the condensate through activated charcoal or other adsorbent material, on which the deleterious volatile constituents are adsorbed, and returning the filtered condensate, free of deleterious volatile constituents, to the juice before it is sealed in containers, is an important feature of this invention.

As an example showing how an accurate control of the peel oil content of the finished juice may be obtained, and the speed with which the process may be accelerated by my invention, reference is made to the above described apparatus having a vacuum tank, such as A of the drawing, of 600-gallon capacity. Into this I introduce 450 gallons of fruit juice from the preheater at a temperature of 190° F. During the entrance of the juice a vacuum of nine inches is maintained, which is sufficient to remove most of the air entrained in the fluid. During boiling under vacuum there will be some drop in the temperature of the juice. Hence, on vessel A I maintain an exterior steam pressure sufficient to hold the temperature of the juice at 175° when the process is finished and the juice is released for canning. This is usually about 15 pounds of steam pressure, depending upon atmospheric conditions. When the tank is filled with juice to the desired level, the vacuum is increased to a point that will produce rapid ebullition. This will be from 11 to 12 inches at the start and will be approximately 15 inches as the temperature drops and the peel oil is removed.

The removal of the peel oil is very rapid and is usually reduced to the optimum content in about 20 seconds. At the critical point, which the operator observes through the sight glass 8, the vacuum is cut off in order to discontinue the boiling after the desired excess of peel oil has been removed. This will occur in about 20 seconds after the boiling point is reached with a batch of 450 gallons. The high vapor velocity produced through a two-inch outlet will, in this short period, reduce the peel oil content from .050% to .010% with a total condensate of approximately one percent or less of the original charge of juice. With a large vapor outlet, more water vapor is drawn off and less peel oil. The amount of water removed increases as the size of the vapor outlet increases, but the amount of peel oil removed depends on the velocity of the vapor and is roughly in inverse proportion of the diameter of the outlet. Since most of the peel oil boils at approximately 349° F., it cannot be boiled off in an open vessel, but it can be removed from a closed vessel by entrainment through a small aperture with high velocity steam.

The processing time, which is very quick, even with large batches, will vary slightly as will be understood, depending upon the amount of peel oil present; but this is not so important as the fact that in practicing my method the quantity of the oil extracted may be very closely controlled to give a uniform product. An example of the variation of this oil experienced in practice is shown in the foregoing table, giving the results of two different test runs, one with juice of high peel oil content, the other with juice having only a medium amount of said oil.

In addition to the advantage obtained by my method of treating fruit juices, whereby I preserve the natural flow of the juice by controlling the percentage of the peel oil retained, there is experienced a further saving in the removal of the fatty acids. Commercially this is highly important, especially when the product is packaged in cans, since they, in time, not only attack the metal itself, rendering the container useless, but likewise, over a time period, the stability of the vitamin factor of the product is lessened when metal is dissolved in the juice, as very small quantities of metal affect the taste of the product and catalyze the oxidation of vitamin C.

I claim:

1. The process of treating fruit juices containing peel oil and acid constitutents consisting in raising the temperature of the juice to the boiling point in a closed container under a vacuum sufficient to vaporize the peel oil and acid constituents, passing said vapors through a condenser, filtering the condensate to remove said acids and reintroducing the filtered condensate into said container.

2. The process of treating fruit juices for packaging, consisting in boiling the juices in a closed vessel under a vacuum at a temperature sufficient to vaporize the peel oil and acid constituents of the juice, maintaining said vacuum sufficiently high for the length of time required to remove said acids and the major portion of said oil, passing the vapors through a condenser, filtering the condensate, returning the latter to said vessel and finally withdrawing the juice from the vessel directly into containers while it is at a temperature above the sterilizing temperature of the juice.

3. The process of treating a fruit juice containing as fluid constituents elements having different boiling points, consisting in raising the temperature of the juice in a closed vessel to a state of ebullition of the constituent having the lower boiling point, bringing to the surface thereof the other constituent by the application of a low vacuum pressure, and applying a higher vacuum to the vessel through an outlet proportioned to the surface area of the fluid to create a withdrawal of the vapors emitted at a velocity to entrain therewith the fluid constituents having the higher boiling point.

4. The process of treating fruit juices containing peel oil having a boiling point above that of the juice, consisting in heating the juice in a closed vessel under a low vacuum pressure sufficient to bring said oil to the surface of the fluid and causing the juice to boil, applying a higher vacuum to create a velocity of movement in the escaping vapor for a period sufficient to eliminate most of the oil by entrainment therewith.

5. The process of treating fruit juice containing peel oil and other objectionable volatile acid constituents which are at least partly soluble in water, consisting in heating the juice to drive off said objectionable constituents in the form of vapor, recovering the latter by condensation and removing said constituents by adsorption on an activated agent and returning the purified condensate to the liquid juice.

6. The process of treating fruit juice for packaging in metal containers which contains peel oil and an acid element capable of attacking such metal, consisting in heating the juice in a closed vessel sufficiently to vaporize the acid element, removing the vapors from the vessel and condensing them, passing the condensate in contact with an absorbing agent to remove said acid element, and returning the purified condensate to the liquid juice before the latter is packaged.

7. The process of treating fruit juices containing peel oil carrying limonene and volatile constituents, comprising boiling an original quantity of the juice under vacuum in a container for a period sufficient to bring the volatile constituents to the surface and eliminating them together with most of the peel oil through entrainment with high velocity vapor, passing the vapors through a condenser, collecting the condensate in a receiver, removing the floating limonene therefrom, and filtering the condensate through adsorption on the surface of an activated agent to remove the acid elements therein and returning said filtrate to the remaining quantity of juice in the container.

8. The process of separating fruit juices containing fluid elements having respectively low and high boiling points, consisting in raising the temperature of both in a closed vessel to the boiling point of the one ebullating at the lowest temperature, to cause the one having the highest boiling point to first rise to the surface of the ebullient fluid in the vessel, and second applying a vacuum to the vessel at such a pressure through an outlet proportioned to the surface area of the fluid to create a high velocity of movement in the escaping vapor and the entrainment therewith of the fluid having the higher boiling point.

9. The process of separating fruit juices containing fluid elements having different boiling points, consisting in raising their temperature in a closed vessel under a low vacuum pressure to the point of ebullition of the one having the lower boiling point and first bringing to the surface of the juices in a state of agitation the fluid having the higher boiling point, then applying a sufficiently higher vacuum to the vessel through an outlet proportioned to the surface area of the fluid to create a velocity of movement in the escaping vapor to entrain therewith the fluid having the higher boiling point.

10. The process of removing the undesirable constituents of fruit juices, consisting in boiling the juices in a closed vessel having an outlet, applying a vacuum to the latter, said vacuum pressure and said outlet being proportioned to the surface area of the juices in the vessel to create a temperature and velocity temporarily to the vapor arising from the ebullition of the mass sufficient to carry with them said undesired constituents.

GRAY SINGLETON.

REFERENCES CITED

The following references are of record in the file of this patent:

UNITED STATES PATENTS

| Number | Name | Date |
| --- | --- | --- |
| 244,517 | Axline | July 19, 1881 |
| 1,284,187 | Gore | Nov. 5, 1918 |
| 2,059,789 | Grindrod | Nov. 3, 1936 |
| 2,151,644 | Stephens | Mar. 21, 1939 |
| 2,347,339 | Singleton | Apr. 25, 1944 |
| 2,361,695 | Sizeroy | Oct. 31, 1944 |